United States Patent [19]

Eser

[11] Patent Number: 4,739,564

[45] Date of Patent: Apr. 26, 1988

[54] BICYCLE PEDAL AND SHOE CONNECTOR

[76] Inventor: Ueli Eser, Ruggenstrasse 16, CH-8903 Birmensdorf, Switzerland

[21] Appl. No.: 914,449

[22] Filed: Oct. 2, 1986

[30] Foreign Application Priority Data

Oct. 4, 1985 [CH] Switzerland .................... 4314/85

[51] Int. Cl.[4] .......................... A43B 5/14; A43B 5/00
[52] U.S. Cl. ........................................ 36/131; 36/134; 74/594.6
[58] Field of Search ................ 36/131, 62, 134, 67 D; 74/594.4, 594.6

[56] References Cited

U.S. PATENT DOCUMENTS

| | | | |
|---|---|---|---|
| 550,409 | 11/1895 | Hanson | 74/594.6 |
| 4,400,856 | 8/1983 | Tseng | 24/290 |
| 4,445,288 | 5/1984 | Fror | 36/134 |
| 4,492,047 | 1/1985 | Arff | 36/134 |

FOREIGN PATENT DOCUMENTS

| | | | |
|---|---|---|---|
| 0146218 | 6/1985 | European Pat. Off. | 36/131 |
| 2240102 | 2/1974 | Fed. Rep. of Germany | 36/131 |
| 3315282 | 10/1984 | Fed. Rep. of Germany | 36/131 |
| 3329993 | 3/1985 | Fed. Rep. of Germany | 74/594.6 |
| 2432427 | 4/1980 | France | 36/131 |
| 183582 | 10/1980 | Italy | 74/594.6 |

Primary Examiner—Steven N. Meyers
Attorney, Agent, or Firm—McGlew and Tuttle

[57] ABSTRACT

On a bicycle pedal is mounted a disc with flange elements projecting radially outward. These flange elements in conjection with inwardly projecting flange elements on the bottom or outsole of a shoe provide a bayonet joint connection that is readily established and equally readily released by axial interpositioning of the flange elements, followed by a twist. In addition, an lug is mounted on the pedal that carches in a corresponding recess in the outsole after the bayonet connection is established.

5 Claims, 3 Drawing Sheets

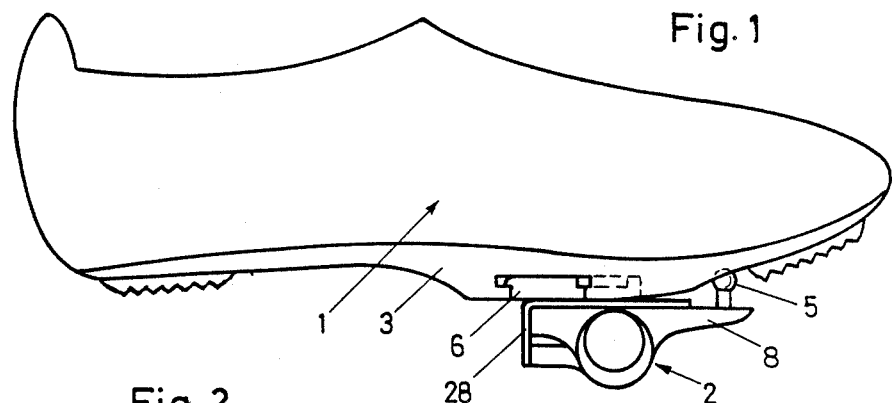
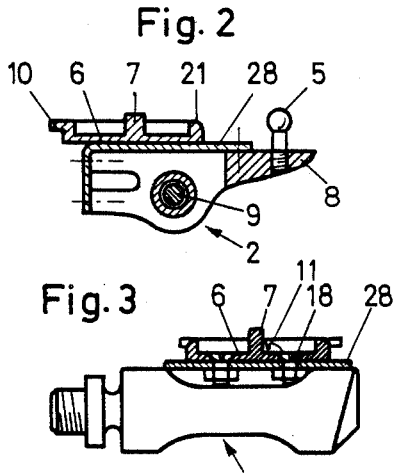
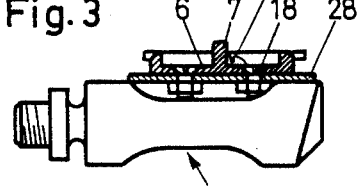
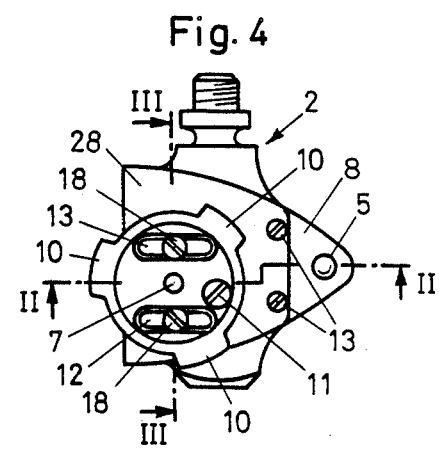
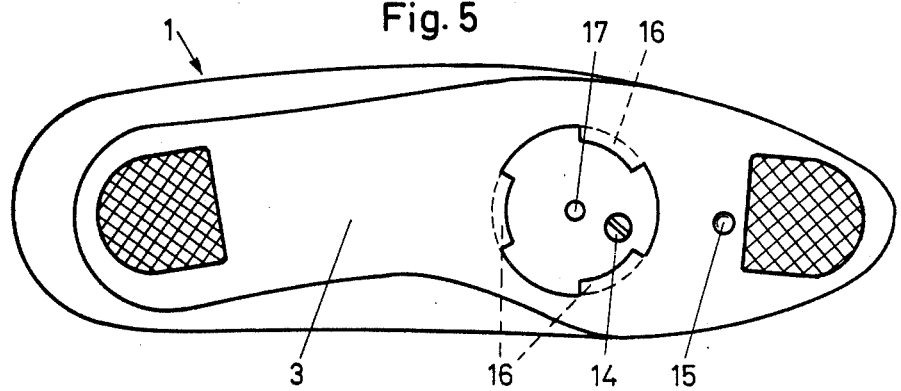
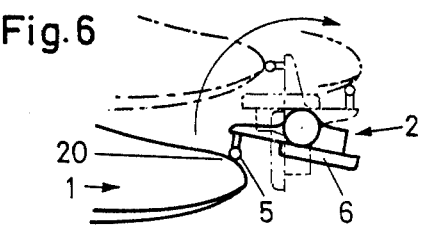

BICYCLE PEDAL AND SHOE CONNECTOR

BACKGROUND OF THE INVENTION

FIELD OF THE INVENTION

This invention relates in general to bicycles and, in particular, to a new useful connection between a bicycle pedal and a shoe.

U.S. No. A-550409 discloses a connection of the kind. According to that document a metal plate with four radially projecting arms is screwed into the underside of the sole as a coupling member. A metal plate in the form of a hooked cross is attached to the pedal as the counterpart element, the four hooks being raised from the level of the metal plate. In order to attach the shoe to the pedal, the hooks must be inserted in the recesses in the sole and by twisting be shoved under the arms of the metal plate that is mounted on the underside of the sole.

Since the cyclist cannot see the underside of the sole and the pedal, errors of alignment and inclination are unavoidable in the attempt to establish the connection. With the prior art connection, therefore, it is difficult to join shoe and pedal together. Moreover, errors of inclination between shoe and pedal can easily result in just a portion of the hooks being caught, which the cyclist would notice only later under the threat of an accident. Even if the connection is established correctly, there is a risk that the shoe will come loose from the pedal due to an unintentional twist of the foot.

SUMMARY OF THE INVENTION

The invention provides a connection that can be quickly and simply joined and guarantees high cycling safety, while avoiding the above-mentioned problems.

According to the invention the coupling member on the underside of the shoe centers the shoe during axial joining of the coupling members and thus automatically adjusts any alignment error. In this way the shoe can be centered quickly even though the coupling site cannot be seen.

A catch effect is obtained by means of a simple design that lets the cyclist know when the shoe is correctly and securely fastened to the pedal. A lug on the pedal is directed toward the tip of the shoe and engages in a corresponding recess on the outsole of the shoe. This has the advantage that the locking effect is reinforced by a downward pedalling force. The risk of unintentional uncoupling, particularly high during pedalling motion, is substantially reduced, because the catch is stronger under a downward force. On the other hand, when uncoupling is required, e.g. when the cyclist stops or falls, there is no downward force on the pedal and the shoe can easily be uncoupled.

Accordingly, it is an object of the invention to provide an improved mechanism for coupling a shoe to a bicycle pedal.

A further object of the invention is to provide a shoe and bicycle pedal coupling device which is capable of permitting a rapid interconnection of a bicycler's shoe with the pedal which may be rapidly released without danger upon necessity.

A further object of the invention is to provide a bicycle pedaling construction which permits rapid interengagement of a cyclist's shoe which is simple in design, rugged in construction and economical to manufacture.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which preferred embodiment of the invention is illustrated.

BRIEF DESCRIPTION OF THE DRAWINGS

In the drawings:

FIG. 1 is a side elevational view of a pedal and a shoe attached to it by a coupling constructed in accordance with the invention;

FIG. 2 is a cross-section of the coupling through a pedal;

FIG. 3 is a side elevational view of the pedal, partly cut away;

FIG. 4 is a top plan view of the coupling over the pedal;

FIG. 5 is a bottom plan view of a shoe with the coupling;

FIG. 6 is a schematic elevational view of a pedal and a shoe in three motion positions;

GENERAL DESCRIPTION OF THE PREFERRED EMBODIMENT

Figure 7:
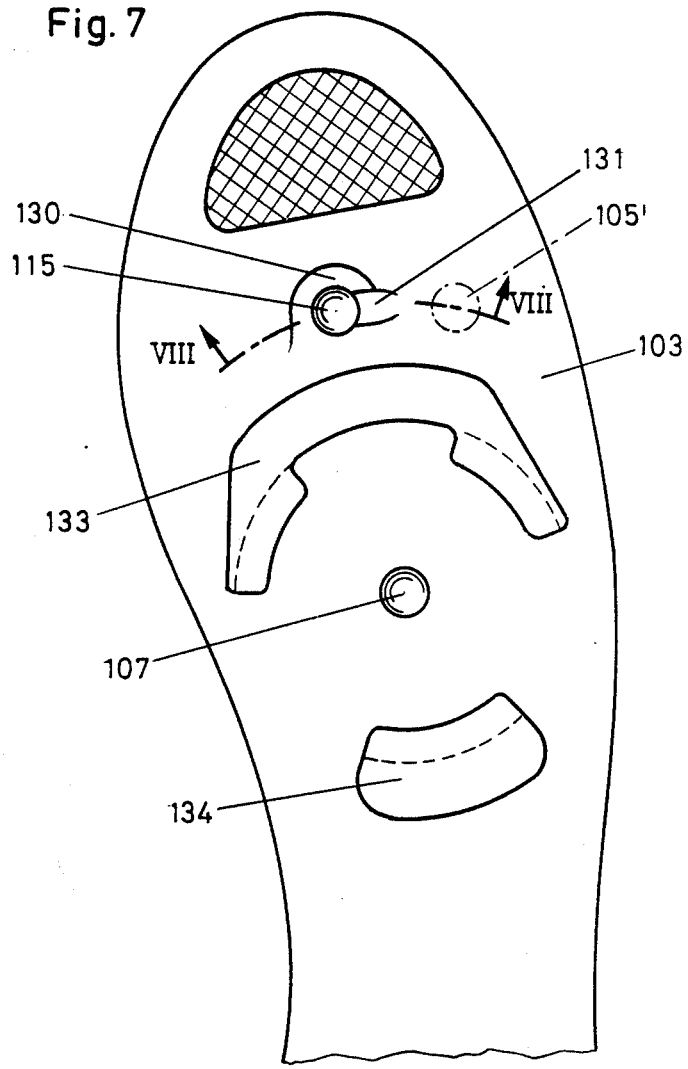
FIG. 7 is a bottom plan view of a shoe in another embodiment.

Referring to the drawings in particular the invention as embodied therein in FIGS. 1 to 6 comprises a coupling arrangement for interengaging a shoe 1 with a bicycle pedal 2 having a body portion 8. In accordance with the invention a first coupling element carried on the shoe 1 comprises a coupling member integrally formed in the bottom or outsole of the shoe 3 and it is easily intercoupled or interengaged with the second coupling member or disc 6 mounted on the pedal body 8. Each disc member 6 include radially extending flange elements which may be fitted between each other when first axially interengaged and which may be lockably interengaged upon relative rotation by wedging actions of the projecting flanges of the other coupling element in the manner of a bayonet joint. In a further aspect of the invention in order to facilitate the locking interengagement of the coupling element pedal 2 and the shoe 1 are provided with a torque theshold locking means including lug 5 shown on the pedal 2 which interengages with a recess on the shoe 1 namely recess 15.

As the figures show, the show 1 has three flange elements 16 formed out of the outsole 3 in the vicinity of the tip 20 of the shoe that are arranged in a circle and directed inward. The flange elements 16 are designed so that they can engage between flange element 10 attached to the pedal 2.

The flange elements 10 are mounted on a pedal disc 6 that is attached by screws 18 to a plate 28 mounted on top of the body 8 of the pedal. The plate 28 is also attached by means of screws 13 to the pedal body 8. Screw holes 12 are provided in the disc 6 and are constructed as elongated slots, so that the disc 6 can be shifted transversely to the direction of the pedal axle 9. On the pedal body 8 there is mounted a vertically projecting lug 5 which catches in a recess in the outsole 3 when the connection has been established.

The flange elements 10 and 16 form a bayonet-joint connection that can be established by axial engagement followed by a radial twist. During the twisting motion, the lug 5 necessarily catches in the recess 15, thus preventing a spontaneous detachment of the connection during operation. Furthermore, projecting screws 11 and 14 on the pedal 2 and outsole 3 form stops that limit the rotational movement of the shoe in one direction after the flange elements 10 and 16 are engaged. Between the flange elements 10 on the pedal disc 6 along the axis of connection is mounted a guide knob 7 that engages in a corresponding shoe recess 17 in the outsole 3 as the connection is made and the shoe 1 is applied. The pedal disc 6 also has circumferential arc-shaped guide surface 21 for the flange elements 16 on the edge between the flange elements 10. the flange elements 10 and 16 are advantageously designed so that when the elements are joined a wedge effect is created between the engaging surfaces, so that this bayonet connection functions like a screw connection.

The way the connection works is as follows:

As FIG. 6 shows, when at rest the pedal 2 is turned so that the lug 5 points downward. In order to establish the bayonet connection, the pedal 2 is turned approximately 180° with the tip of the shoe on the lug 5 in the direction indicated by the arrow. The shoe 1 is now positioned diagonally to the pedal axle 9, with the tip 20 of the shoe pointing towards the bicycle, (not shown). The connection is established by a short downward motion, followed by a radial twist of the shoe 1.

The lug 5 and the corresponding recess 15 in the outsole 3 are so constructed that once the connection is made a catch effect results. This prevents the shoe 1 from swivelling out unintentionally. Furthermore, a swivelling motion of the shoe 1 in which the heel moves toward the bicycle is avoided by the impact of screws 11 and 14. After the connection is made, the shoe 1 is positioned roughly at right angles to the pedal axle 9 and is held in an optimum position for operating the bicycle crank.

In order to release the shoe 1 from the pedal 2, the heel of the shoe is pivoted away from the bicycle by about 20° to 30° and the shoe is lifted in a short motion. It has been found out that the motions requires to establish and release the connection are quickly learned by the cyclist and can be thoroughly mastered in a short time.

Figure 8:
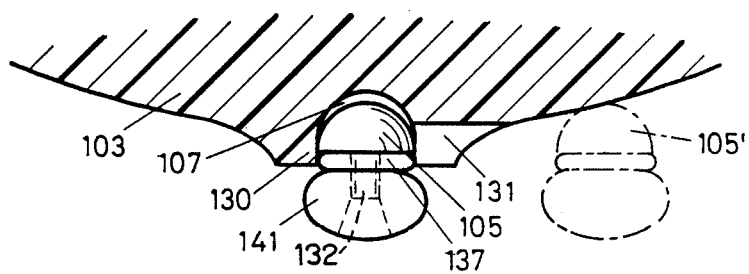
FIG. 8 is a section taken along the VIII—VIII of FIG. 7.

The sole 103 shown in FIG. 7 has a recess 115 between the coupling elements 133 and 134 and the tip of the shoe and is set over a prominence 130 as shown in FIG. 8. An arm 141 formed out of the pedal 102 (FIG. 9) has a hemisphere 105 on its tip that, as the coupling elements are united, runs along line VIII—VIII on the sole into the recess 115 with increasing frictional resistance. The hemisphere 105 that catches in the recess 115 is prevented from going further to the left (FIG. 7) by the prominence 130. The prominence 130 has a channel 131 so that the connection can be released by a counter-pivot.

As FIG. 8 shows, a peg 132 is mounted on the hemisphere 105 and screwed into the arm 141. Between the arm 141 and the hemisphere 105 is gripped a ring 137 of plastic. To increase or diminish the catch effect, the ring 137 can be replaced by a correspondingly thicker or thinner ring. The inclination of the sole surface along line VIII—VIII is such that after the coupling elements are joined the sphere 105' lies against the underside of the sole. The sphere 105' here serves as a support for the shoe and makes it easier for the cyclist to find the correct angle of inclination for the shoe.

The coupling elements 133 and 134 form projecting parts that are formed out of the sole 103 and are positioned between recesses 107 that correspond to the coupling elements on the pedal.

Figure 9:
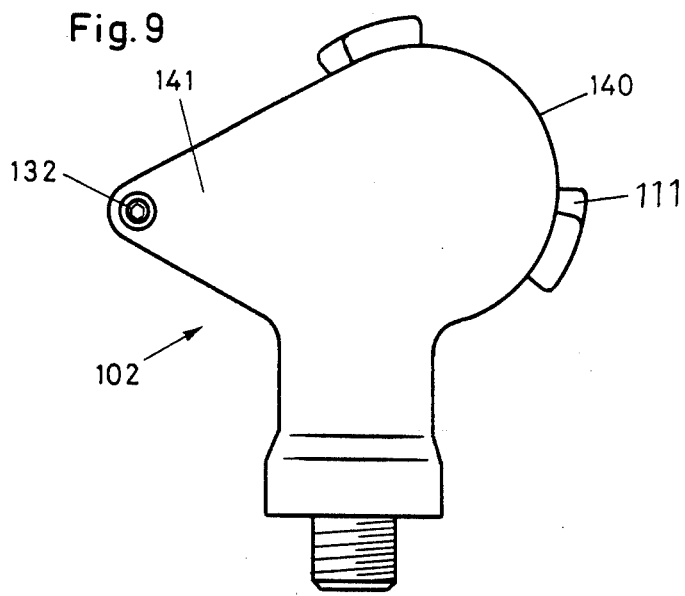
FIG. 9 is a side elevational view of a pedal in another embodiment, viewed from underneath.
Figure 10:
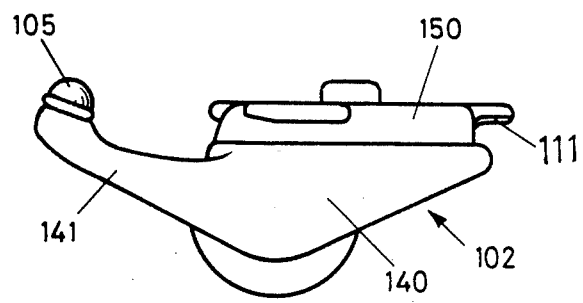
FIG. 10 is an elevational view of the pedal in FIG. 9 viewed in the direct of the pedal axle.
Figure 11:
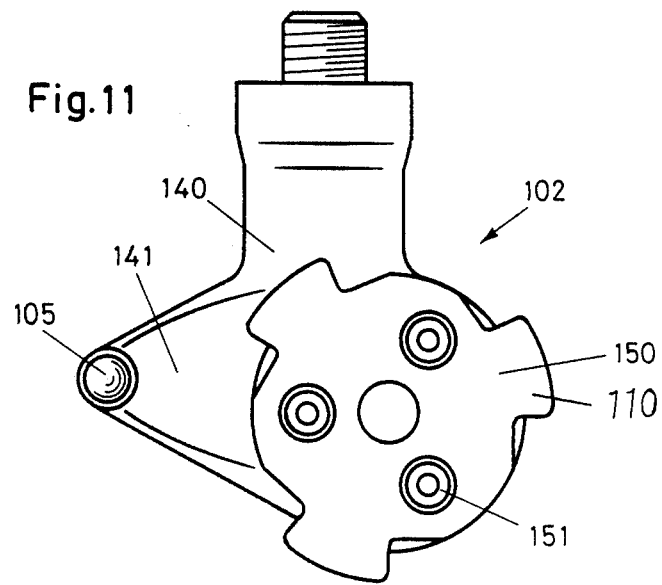
FIG. 11 is a top plan view of the pedal of FIG. 9.

The pedal 102 shown in FIGS. 9 through 11 has a pedal body 140 of a plastic material out of which the lug 141 is formed. On the pedal body 140 a coupling member 150 is attached with pegs 151; it is made of light metal and has coupling elements 110 projecting radially outward. The elements 110 have tapered sides 111 that wedge the coupling elements 133 and 134 against the pedal 102 when the coupling members are joined.

The pedal 102 is so shaped, as can be seen clearly in FIGS. 9 through 11, that it creates very little aerodynamic resistance during cycling, and it is also very light in weight.

While specific embodiments of the invention have been shown and described in detail to illustrate the application of the principles of the invention, it will be understood that the invention may be embodied otherwise without departing from such principles.

What is claimed is:

1. A connection between a pedal of a bicycle and a shoe, comprising: a first coupling member mounted on the underside of the shoe, a second coupling member mounted on the pedal for joining with said first coupling member, said first and second coupling members having radially projecting flanges which engageably interfit and interengage after axial engagement followed by a twist of the shoe relative to the pedal which may be released again by a corresponding countermotion, said first coupling member mounted on the underside of said shoe and said coupling member mounted on said pedal further having a circumferential guide surface on an edge between said radially projecting flanges associated with said pedal, for said coupling member mounted on said shoe; and, torque threshold locking means, located between said shoe and said pedal, for permitting interengagement of said shoe with said pedal and for holding the coupled shoe against rotation, in a normal position with respect to the pedal until a torque associated with the counter-motion reaches a certain threshold.

2. A bicycle racing shoe with a first coupling member for connection with a pedal having a second coupling member, said first coupling member being integrally formed on the outsole of said shoe and comprising a plurality of radially extending flanges and a central centering element for engagement by a corresponding centering element of the pedal the outside of the shoe in an area between said first coupling element and the tip of the shoe, comprises a recess for engagement with a lug on the pedal for forming a catch.

3. A pedal for connection to a shoe having a first coupling member, the pedal comprising a second coupling member with a plurality of radially extending flanges and a central centering element for engagement with a corresponding centering element of the shoe; a lug spaced from said centering element of said first coupling member for engagement with a recess of the shoe for forming a catch, the lug being a hemispherical head of a screw adjustably screwed into a body of the pedal.

4. A pedal according to claim 3, wherein the radially extending flanges of the second coupling member are formed on a plate fastened onto the body of the pedal.

5. A connection between a pedal of a bicycle and a shoe comprising: a first coupling member mounted on the underside of the shoe, a second coupling member mounted on the pedal for joining with said first coupling member, said first and second coupling members having radially projecting flanges which engageably interfit and interengage after axial engagement followed by a twist of the shoe relative to the pedal which may be released again by a corresponding countermotion, said first coupling member mounted on the underside of said shoe of said coupling member mounted on said pedal being constructed so that during axial joining of the coupling members, the coupling members act to center the shoe relative to the pedal, and torque threshold locking device including a lug mounted on said pedal and a recess formed in said shoe, for permitting interengagement of said shoe with said pedal so as to form the coupled shoe, against rotation, in a normal position with respect to the pedal when the lug and the recess engage so as to form a catch effect until a torque associated with the counter motion reaches a certain threshold, said coupling member mounted on said pedal having a flange shaped element extending radially outwardly that can be inserted in a corresponding recess of said flange shaped element carried by said shoe, said coupling member mounted on said pedal having a circumferential guide surface on an edge between said radially projecting flanges associated with said pedel, for said coupling member mounted on said shoe.

* * * * *